(12) United States Patent
Fu et al.

(10) Patent No.: US 12,035,323 B2
(45) Date of Patent: Jul. 9, 2024

(54) PDCCH MONITORING METHOD, APPARATUS, ELECTRONIC DEVICE AND COMPUTER READABLE STORAGE MEDIUM

(71) Applicant: SAMSUNG ELECTRONICS CO., LTD., Gyeonggi-do (KR)

(72) Inventors: Jingxing Fu, Beijing (CN); Chen Qian, Beijing (CN); Feifei Sun, Beijing (CN); Qi Xiong, Beijing (CN)

(73) Assignee: Samsung Electronics Co., Ltd (KR)

( * ) Notice: Subject to any disclaimer, the term of this patent is extended or adjusted under 35 U.S.C. 154(b) by 508 days.

(21) Appl. No.: 17/290,379

(22) PCT Filed: Nov. 1, 2019

(86) PCT No.: PCT/KR2019/014744
§ 371 (c)(1),
(2) Date: Apr. 30, 2021

(87) PCT Pub. No.: WO2020/091520
PCT Pub. Date: May 7, 2020

(65) Prior Publication Data
US 2021/0410171 A1    Dec. 30, 2021

(30) Foreign Application Priority Data

Nov. 1, 2018 (CN) .......................... 201811296404.4
Feb. 1, 2019 (CN) .......................... 201910104398.6

(51) Int. Cl.
H04W 72/23    (2023.01)
(52) U.S. Cl.
CPC .................................. H04W 72/23 (2023.01)

(58) Field of Classification Search
CPC ..... H04L 5/001; H04L 5/0053; H04L 5/0096; H04L 5/0064; H04L 5/0098
See application file for complete search history.

(56) References Cited

U.S. PATENT DOCUMENTS

2018/0183551 A1    6/2018    Chou et al.
2018/0242319 A1    8/2018    Akkarakaran et al.
(Continued)

FOREIGN PATENT DOCUMENTS

CN    101932070    12/2010
CN    107872891    4/2018
(Continued)

OTHER PUBLICATIONS

PCT/ISA/210 Search Report issued on PCT/KR2019/014744, Feb. 11, 2020, pp. 3.
(Continued)

Primary Examiner — Zhensheng Zhang
(74) Attorney, Agent, or Firm — The Farrell Law Firm, P.C.

(57) ABSTRACT

The present application relates to the field of wireless communication technologies, and in particular, to a PDCCH monitoring method, apparatus, electronic device and computer readable storage medium. The PDCCH monitoring method includes: determining PDCCH monitoring configuration on a target active downlink bandwidth part (BWP), after a current active downlink BWP is switched to the target active downlink BWP; performing a monitoring process on the PDCCH based on the PDCCH monitoring configuration on the target active downlink BWP. The present application achieves effective monitoring of the PDCCH on the switched active downlink BWP, saves power consumption of the UE, and ensures timely transmission of data.

15 Claims, 3 Drawing Sheets

(56) References Cited

U.S. PATENT DOCUMENTS

| | | |
|---|---|---|
| 2018/0279274 A1 | 9/2018 | Sun et al. |
| 2019/0246395 A1* | 8/2019 | Huang ................. H04W 72/12 |
| 2020/0221508 A1 | 7/2020 | Huang et al. |

FOREIGN PATENT DOCUMENTS

| | | |
|---|---|---|
| CN | 108012329 | 5/2018 |
| CN | 108633070 | 10/2018 |
| WO | WO 2016/064048 | 4/2016 |
| WO | WO 2016/163807 | 10/2016 |
| WO | WO 2018/028703 | 2/2018 |
| WO | WO 2018-085145 | 5/2018 |
| WO | WO 2018/127217 | 7/2018 |

OTHER PUBLICATIONS

PCT/ISA/237 Written Opinion issued on PCT/KR2018/014744, Feb. 11, 2020, pp. 5.

Huawei, HiSilicon, "Corrections on bandwidth part and CA", 3GPP TSG RAN WG1 Meeting #94bis, R1-1810112, Chengdu, China, Sep. 29, 2018, pp. 16.

CATT, "Remaining issues on CA and BWP operation", 3GPP TSG RAN WG1 Meeting #94bis, R1-1810523, Chengdu, China, Sep. 29, 2018, pp. 8.

LG Electronics Inc., "UE Autonomous BWP Switching for Configured UL Resources", R2-1801243, 3GPP TSG-RAN WG2 NR AH, Jan. 22-26, 2018, 3 pages.

Spreadtrum Communications, Remaining Issues on Carrier Aggregation and Bandwidth Parts, R1-1811004, 3GPP TSG RAN WG1 Meeting #94bis, Oct. 8-12, 2018, 9 pages.

Chinese Office Action dated Apr. 11, 2023 issued in counterpart application No. 201910104398.6, 10 pages.

Huawei, HiSilicon, "Summary of Remaining Issues on Bandwidth Part and Wideband Operation", R1-1801347, 3GPP TSG RAN WG1 Meeting #92, Feb. 26-Mar. 2, 2018, 13 pages.

Vivo, "Remaining Issues on Physical Downlink Control Channel", R1-1810369, 3GPP TSG RAN WG1 Meeting #94bis, Oct. 8-12, 2018, 6 pages.

NTT DoCoMo, Inc., "Offline Summary for AI 7.3.1.2 Remaiing Details on Search Page", R1-1721414, 3GPP TSG RAN WG1 Meeting 91, Nov. 27-Dec. 1, 2017, 24 pages.

Qualcomm Incorporated, "Open Issues on BWP", R1-1720693, 3GPP TSG RAN WG1 #91, Nov. 27-Dec. 1, 2017, 15 pages.

European Search Report dated Nov. 15, 2021 issued in counterpart application No. 19879028.9-1205, 7 pages.

Qualcomm Incorporated, "Channel Bandwidth UE Capabilities", R2-1812923, 3GPP TSG-RAN WG2 Meeting #103, Aug. 20-24, 2018, 15 pages.

Chinese Office Action dated Jan. 2, 2024 issued in counterpart application No. 201910104398.6, 7 pages.

* cited by examiner

[Fig. 1]
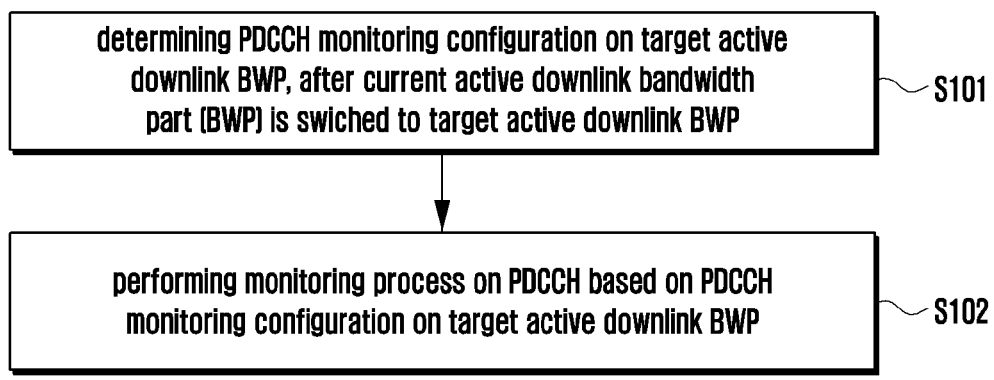
[Fig. 2]
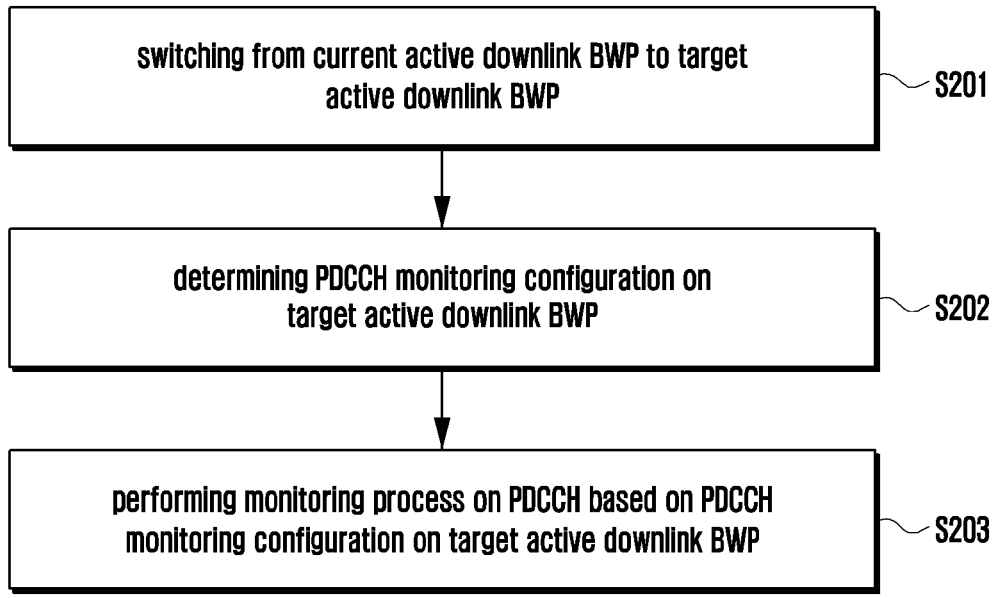

[Fig. 3]
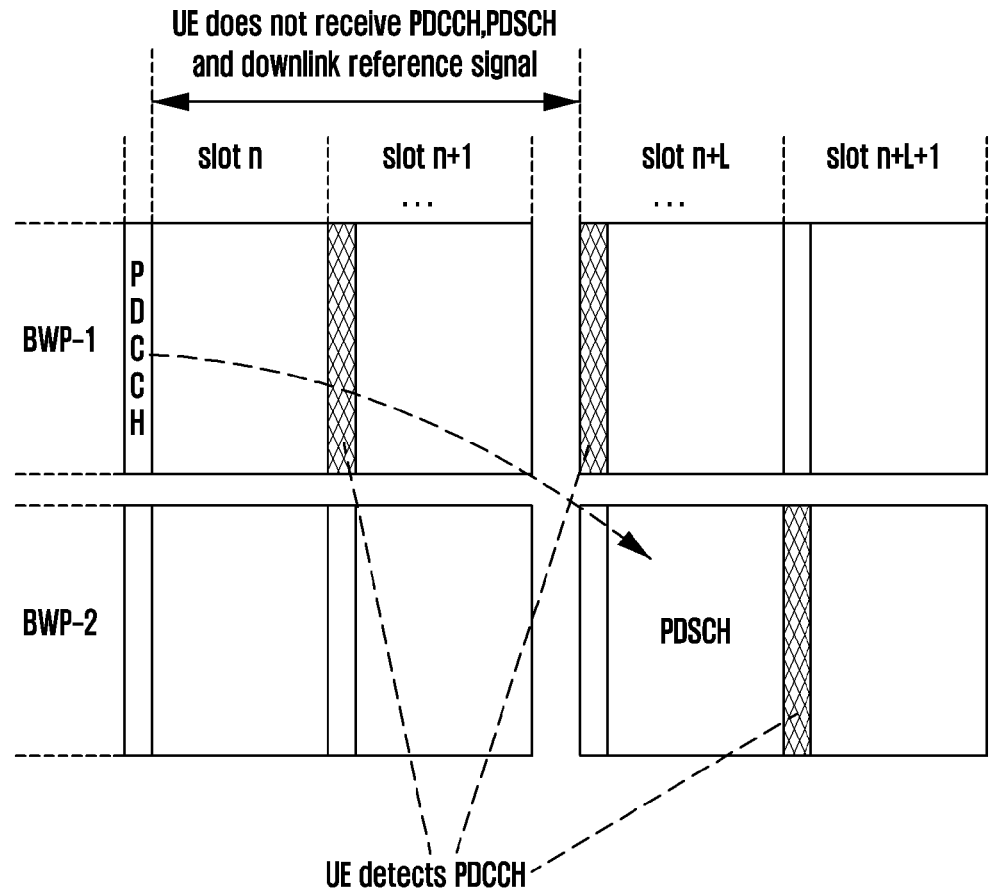
[Fig. 4]
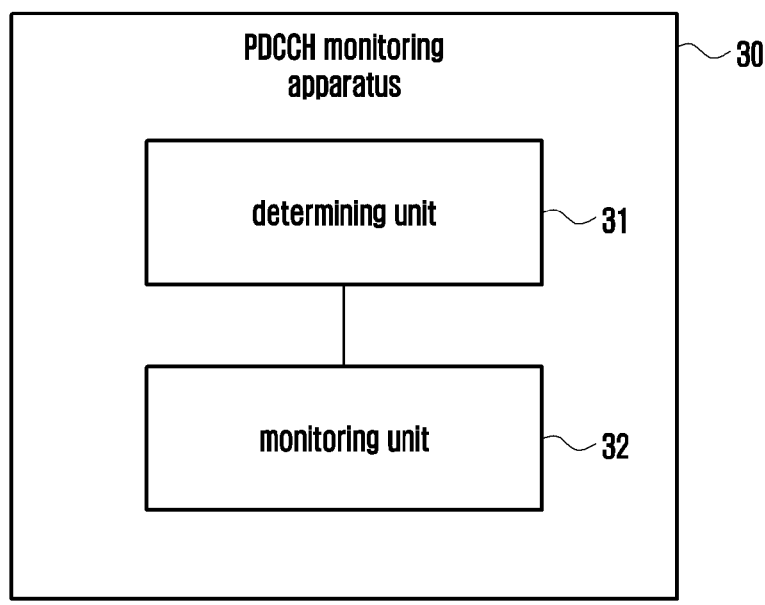

[Fig. 5]
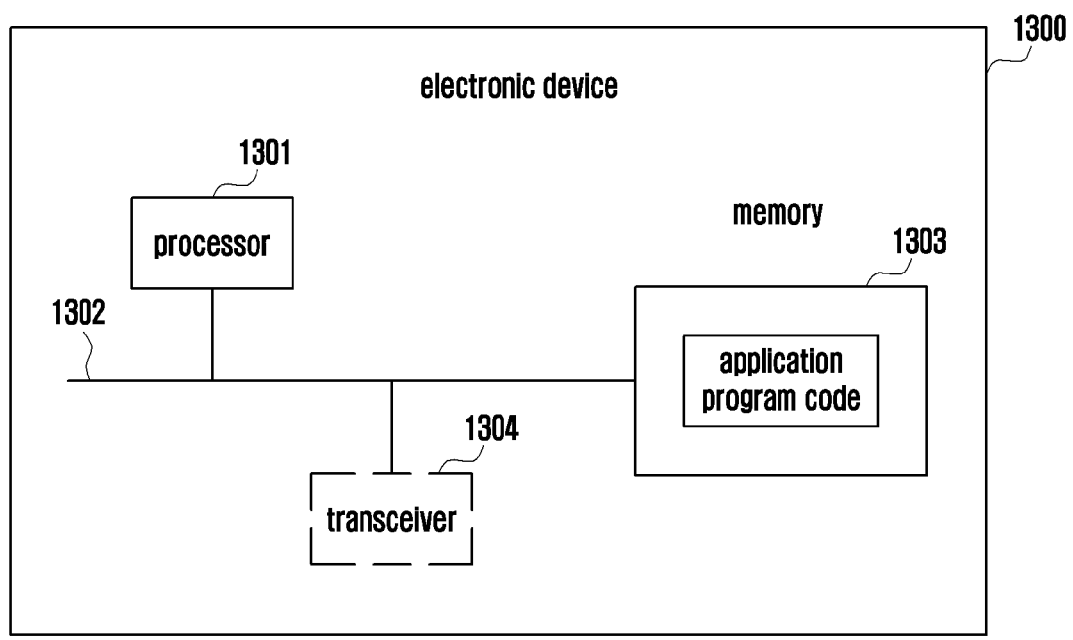

PDCCH MONITORING METHOD, APPARATUS, ELECTRONIC DEVICE AND COMPUTER READABLE STORAGE MEDIUM

PRIORITY

This application is a National Phase Entry of PCT International Application No. PCT/KR2019/014744 which was filed on Nov. 1, 2019, and claims priority to Chinese Patent Application Nos. 201811296404.4 and 201910104398.6, which were filed on Nov. 1, 2018 and Feb. 1, 2019, respectively, the content of each of which is incorporated herein by reference.

TECHNICAL FIELD

The present application relates to the field of wireless communication technologies, and in particular, to a PDCCH monitoring method, apparatus, electronic device and computer readable storage medium.

BACKGROUND ART

In a new radio (NR) air interface system, a bandwidth of a carrier is relatively large, and bandwidth capability of some user equipments (UEs) is limited, so that signals and channels can only be transmitted or received within a part bandwidth of the frequency domain bandwidth of the carrier. However, some UEs have relatively strong bandwidth capability and can transmit or receive signals and channels within the entire frequency domain bandwidth of the carrier. What a bandwidth capability of a UE herein refers to means a maximum bandwidth that the UE can receive or transmit signals and channels on a frequency domain at the same time. For example, some UEs have bandwidth capability of 20 megahertz (MHz), and some UEs have bandwidth capability of 5 MHz. For a UE with a weak bandwidth capability, in order to improve frequency diversity performance of the UE, the UE may work in a limited frequency band with good performance at different time, which a limited frequency band is referred to as a Bandwidth Part (BWP). That is, the UE may be switched within different BWPs to receive or transmit signals and channels at different time.

In NR, the UE senses a physical downlink control channel (PDCCH) according to PDCCH monitoring configuration. In view of this, at present, when the UE transforms active downlink BWPs, how to implement effective monitoring of the PDCCH on the switched active downlink BWPs becomes a technical problem to be solved.

DISCLOSURE OF INVENTION

Technical Problem

The purpose of the present application aims to solve at least one of the above technical defects, and in particular, the problem of how to implement effective monitoring of the PDCCH on the switched active downlink BWP when the UE transforms active downlink BWP.

Solution to Problem

In a first aspect, the present application provides a PDCCH monitoring method, including:

determining PDCCH monitoring configuration on a target active downlink bandwidth part (BWP), after a current active downlink BWP is switched to the target active downlink BWP;

performing a monitoring process on the PDCCH based on the PDCCH monitoring configuration on the target active downlink BWP.

In a second aspect, the present application provides a PDCCH monitoring apparatus, including:

a determining unit, configured to determine a physical downlink PDCCH monitoring configuration on a target active downlink BWP, if a current active downlink bandwidth part (BWP) is switched to the target active downlink BWP;

a monitoring unit, configured to perform a monitoring process on the PDCCH based on the PDCCH monitoring configuration on the target active downlink BWP.

In a third aspect, the present application provides an electronic device, including:

at least one processor; and at least one memory and bus connected to the processor, wherein, the processor and the memory complete communication with each other through the bus;

the processor is configured to invoke a program instruction in the memory to perform the foregoing PDCCH monitoring method.

In a fourth aspect, the present application provides a computer readable storage medium configured to store a computer instruction that, when executed by a processor, implements steps of the foregoing PDCCH monitoring method.

Additional aspects and advantages of the present application will partly be presented in the following description, and become apparent in the following description or be appreciated in practicing of the present application.

Advantageous Effects of Invention

In the present application, after the current active downlink BWP is switched to the target active downlink BWP, the PDCCH monitoring configuration on the target active downlink BWP is determined and the monitoring process on the PDCCH is performed based on the PDCCH monitoring configuration on the determined target active downlink BWP, which achieves effective monitoring of the PDCCH on the switched active downlink BWP, saves power consumption of the UE, and ensures timely transmission of data.

BRIEF DESCRIPTION OF DRAWINGS

The above and/or additional aspects and advantages of the present application will become apparent and readily understood by describing in detail embodiments thereof with reference to the accompanying drawings, in which:

FIG. 1 is a method flowchart of a PDCCH monitoring method according to an embodiment of the present application;

FIG. 2 is a flowchart of a specific process of a PDCCH monitoring method according to an embodiment of the present application;

FIG. 3 is a schematic structural diagram of a BWP transform according to an embodiment of the present application;

FIG. 4 is a schematic structural diagram of a PDCCH monitoring apparatus according to an embodiment of the present application; and FIG. 5 is a schematic structural diagram of an electronic device of resource control method according to an embodiment of the present application.

MODE FOR THE INVENTION

Embodiments of the present application will be described in detail hereafter. The examples of these embodiments have been illustrated in the drawings throughout which the same or similar reference numerals refer to the same or similar elements or elements having the same or similar functions. The embodiments described hereafter with reference to the drawings are illustrative, merely used for explaining the present application and should not be regarded as any limitations thereto.

It should be understood by those skill in the art that singular forms "a", "an", "the", and "said" may be intended to include plural forms as well, unless otherwise stated. It should be further understood that terms "include/including" used in this specification of the present application specify the presence of the stated features, integers, steps, operations, elements and/or components, but not exclusive of the presence or addition of one or more other features, integers, steps, operations, elements, components, and/or combinations thereof. It should be understood that when an element is referred to as being "connected to" or "coupled to" another element, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Those skilled in the art will appreciate that all terms (including technical terms and scientific terms) used herein have the same meaning as commonly understood by one of ordinary skill in the art belonging to the field of the present application, unless otherwise defined. It should also be understood that those terms, such as those defined in a general dictionary, should be understood as having a meaning consistent with the meaning in the context of the prior art, and it is not intended to be construed in an idealized or overly formal sense unless specifically defined herein.

Those skilled in the art may understand that the "terminal" and "terminal equipment" as used herein include both a wireless signal receiver device only having a wireless signal receiver without a transmitting capability, and a receiving and transmitting hardware having a device capable of receiving and transmitting hardware for two-way communication over a two-way communication link. Such device may include: a cellular or other communication device having a single line display or a multi-line display, or a cellular or other communication device without a multi-line display; a PCS (Personal Communications Service), which may combine voice, data processing, fax and/or data communication capabilities; a PDA (Personal Digital Assistant), which may include a radio frequency receiver, a pager, Internet/Intranet access, a web browser, a notepad, a calendar, and/or a GPS (Global Positioning System) receiver; a conventional laptop and/or a palmtop computer or other devices having and/or including a radio frequency receiver. As used herein, "terminal" and "terminal equipment" may be portable, transportable, installed in a vehicle (in aviation, sea and/or land), or adapted and/or configured to operate locally, and/or operated in any other position on the earth and/or space in a distributed form. As used herein, "terminal" and "terminal equipment" may also be a communication terminal, an internet terminal, and a music/video playing terminal, for example, a PDA, a MID (Mobile Internet Device), and/or a mobile phone having a music/video playback function, and may also be a smart TV, a set-top box and other devices.

When performing monitoring on the PDCCH according to the PDCCH monitoring configuration and the amount of the service is small, the periodicity of PDCCH monitoring may be increased, and the PDCCH monitoring time may be reduced, and meanwhile, the times of monitoring PDCCH of every PDCCH monitoring time and the candidate number of the aggregation level of PDCCH monitoring may be reduced, which may reduce the power consumption of the user terminal.

Based on this, as shown in FIG. 1, which shows a flowchart of the PDCCH monitoring method provided by the present application, the method includes the following steps:

Step S101: after a current active downlink bandwidth part (BWP) is switched to a target active downlink BWP, determining PDCCH monitoring configuration on the target active downlink BWP;

Step S102: performing a monitoring process on the PDCCH based on the PDCCH monitoring configuration on the target active downlink BWP.

In the present application, after the current active downlink BWP is switched to the target active downlink BWP, the PDCCH monitoring configuration on the target active downlink BWP is determined and the monitoring process on the PDCCH is performed based on the PDCCH monitoring configuration on the determined target active downlink BWP, which achieves effective monitoring of the PDCCH on the switched active downlink BWP, saves power consumption of the UE, and ensures timely transmission of data.

Based on the foregoing PDCCH monitoring method provided by the present application, the following is a detailed description of the method, as shown in FIG. 2, which is a schematic flowchart of a specific processing procedure of the PDCCH monitoring method provided by the present application, including the following steps:

Wherein, in this embodiment, the current active downlink BWP refers to an active downlink BWP before switched, and the target active downlink BWP refers to a new switched active downlink BWP; the new switched active downlink BWP refers to that, when the UE is configured with at least two downlink BWPs, the active downlink BWP is switched from the downlink BWP-1 to the downlink BWP-2, the downlink BWP-2 is referred to as the new switched active downlink BWP, and the downlink BWP-1 is referred to as the active downlink BWP before switched.

In a possible implementation, the process of the foregoing step S101 specifically includes the process of the following steps S201 to S202.

Step S201: the current active downlink BWP is switched to the target active downlink BWP.

For the present application, before the processing, the transform operation of the active downlink BWP needs to be first performed, that is, the current active downlink BWP is switched to the target active downlink BWP. The method for triggering the transform operation of the active downlink BWP may include two manners. The first manner is to trigger the transform of the active downlink BWP by received DCI indication for scheduling a physical downlink shared channel (PDSCH), and the second manner is to trigger the transform of the active downlink BWP by a timer. The following describes how the UE determines the PDCCH monitoring configuration used on the new switched active downlink BWP in the following step S202, in these two transform manners of the active downlink BWP.

Step S202: the PDCCH monitoring configuration on the target active downlink BWP is determined.

For the present application, in one possible implementation, the UE determines that the PDCCH monitoring configuration on the new switched activated downlink BWP may be determined according to an explicit signaling indication, for example, common physical layer signaling or UE-specific physical layer signaling.

In one possible implementation, the UE determines that the PDCCH monitoring configuration on the new switched activated downlink BWP may also be determined according to an implicit signaling indication, for example, according to the triggering manner of transforming the active downlink BWP. For example, when the triggering manner of transforming the active downlink BWP is a timer trigger or a trigger of downlink control information (DCI), the PDCCH monitoring configurations on the new switched active downlink BWP in different triggering manner are determined respectively. Alternatively, the UE may also determine the corresponding PDCCH monitoring configuration on the new switched active downlink BWP according to the PDCCH monitoring configuration on the active downlink BWP before switched.

Wherein, the PDCCH monitoring configuration may include:
the periodicity of PDCCH monitoring;
the number of PDCCH monitoring times;
the AL of the control channel element (CCE) of PDCCH monitoring, etc.

For the present application, different PDCCH monitoring configurations are determined according to the amount of data to be transmitted. When the amount of data is large, the periodicity of PDCCH monitoring is short, the number of monitoring times is large, and the number of AL candidates for monitoring is large, so that data can be transmitted in time; when the amount of data is small, the adopted periodicity of PDCCH monitoring is long, the number of monitoring times is small, and the number of AL candidates for monitoring is small, which can save power.

The PDCCH monitoring configuration of each downlink BWP configured by the UE is independently configured. In order to determine each of different PDCCH monitoring configurations according to the amount of data to be transmitted, the PDCCH monitoring configuration may be determined according to the periodicity of PDCCH monitoring, the number of PDCCH monitoring times, the number of AL candidates for monitoring and the like, for example, as shown in Table 1, the different PDCCH monitoring configurations have different power saving levels.

Table 1: corresponding relationship between PDCCH monitoring configurations and PDCCH monitoring configuration parameters

TABLE 1

| PDCCH monitoring configuration | the periodicity of PDCCH monitoring | the number of PDCCH monitoring times | the number of AL candidates of PDCCH monitoring |
|---|---|---|---|
| 1 | T1 | N1 | M1 |
| 2 | T2 | N2 | M2 |
| 3 | T3 | N3 | M3 |
| 4 | T4 | N4 | M4 |

When the UE is configured with at least two downlink BWPs (for example, the downlink BWP-1 and the downlink BWP-2) and only has one active downlink BWP, the active downlink BWP may be switched from the downlink BWP-1 to the downlink BWP-2.

In a possible implementation, the UE may determine the PDCCH monitoring configuration adopted on the new switched active downlink BWP according to the indication information (e.g., the common indication information or the reference signal) or the physical layer signaling.

In a possible implementation, the UE may determine the PDCCH monitoring configuration adopted on the new switched active downlink BWP according to a protocol preset or the high layer signaling configuration. For example, the protocol may preset that the PDCCH monitoring configuration adopted by the UE on the new switched active downlink BWP is PDCCH monitoring configuration 1, and consequently, the UE may determine to use the PDCCH monitoring configuration 1 on the new switched active downlink BWP to perform PDCCH monitoring according to the preset of the protocol; alternatively, the protocol may preset that the PDCCH monitoring configuration adopted by the UE on the new switched active downlink BWP is PDCCH monitoring configuration 4, and consequently, the UE may determine to use the PDCCH monitoring configuration 4 on the new switched active downlink BWP to perform PDCCH monitoring according to the preset of the protocol.

In a possible implementation, in case of receiving the indication information or the physical layer signaling, the UE may determine the PDCCH monitoring configuration adopted on the new switched active downlink BWP according to the indication information or the physical layer signaling; however, in case of not receiving the indication information or the physical layer signaling, UE determines the PDCCH monitoring configuration adopted on the new switched active downlink BWP according to the protocol preset or the higher layer signaling configuration.

The above technical solutions are interpreted in detail below with specific embodiments.

For the present application, when determining the PDCCH monitoring configuration on the target active downlink BWP, it may be based on the triggering manner of transforming the active downlink BWP, or may also be based on the PDCCH monitoring configuration on the current active downlink BWP. The process of determining the PDCCH monitoring configuration on the target active downlink BWP based on the triggering manner of transforming the active downlink BWP is described in detail below.

In this process, the triggering manner for triggering to transform the active downlink BWP by the downlink control information (DCI) for scheduling the physical downlink shared channel (PDSCH) is first interpreted.

Manner I: the triggering manner of transforming the active downlink BWP is triggered by the DCI indication for scheduling the PDSCH.

In this manner, the determining the PDCCH monitoring configuration adopted on the new switched active downlink BWP in step S202 may further include one of the following methods:

Method I. 1: the PDCCH monitoring configuration on the target active downlink BWP is determined based on a protocol preset or higher layer signaling configuration.

For the present application, the UE may determine the PDCCH monitoring configuration adopted on the new switched active downlink BWP according to the protocol preset or the higher layer signaling configuration.

For example, the protocol may preset that the PDCCH monitoring configuration adopted by the UE on the new switched active downlink BWP is the PDCCH monitoring configuration p, and the PDCCH monitoring configuration p may be the most power-saving, or may be suitable for transmitting the maximum amount of data, so that the method is relatively simple without additional signaling. However, this PDCCH monitoring may not be in accordance with the amount of data to be transmitted, which may not save power or transmit data in time.

Method I. 2: the PDCCH monitoring configuration on the target active downlink BWP is determined based on a field of the PDCCH monitoring configuration on the target active downlink BWP indicated by a received physical layer signaling or common indication information or reference signal.

The UE may determine the PDCCH monitoring configuration adopted by the UE on the new switched active downlink BWP, by receiving the physical layer signaling indication. The physical layer signaling may be UE-specific physical layer signaling, for example, signaling in a UE-specific DCI in which the UE schedules a PDSCH or signaling in a UE-specific DCI in which the UE does not schedule a PDSCH; or may also be common physical layer signaling, for example, signaling in a group-common DCI.

In an exemplary embodiment, the UE may determine the PDCCH monitoring configuration adopted by the UE on the new switched active downlink BWP by receiving signaling in a UE-specific DCI in which the UE schedules a PDSCH, for example, the UE may determine the PDCCH monitoring configuration used by the UE on the new switched active downlink BWP by receiving the UE-specific physical layer signaling. For example, the UE may determine the PDCCH monitoring configuration used by the UE on the new switched active downlink BWP by receiving the field (e.g., 2-bit indication field that is used to indicate the PDCCH monitoring configuration adopted by the UE on the new switched active downlink BWP, as shown in Table 2) indicating the PDCCH monitoring configuration adopted by the UE on the new switched active downlink BWP in the DCI that triggers to transform the active downlink BWP.

Table 2: mapping table of indication field values and the PDCCH monitoring configurations adopted by the UE on the new switched active downlink BWP

TABLE 2

| Indication field value | PDCCH monitoring configuration |
|---|---|
| 00 | PDCCH monitoring configuration 1 |
| 01 | PDCCH monitoring configuration 2 |
| 10 | PDCCH monitoring configuration 3 |
| 11 | PDCCH monitoring configuration 4 |

Since the PDCCH monitoring configuration of each downlink BWP may be different, the number of bits of a common PDCCH monitoring configuration field may be selected, which is used for the indication of the PDCCH monitoring configuration when the active downlink BWP is unswitched and the indication of the PDCCH monitoring configuration when the active downlink BWP is switched. For example, the UE is configured with two downlink BWPs (for example, the downlink BWP-1 and the downlink BWP-2), the downlink BWP-1 is configured with two PDCCH monitoring configurations, and the downlink BWP-2 is configured with 4 PDCCH monitoring configurations. In the case of the indication of the PDCCH monitoring configuration when the active downlink BWP is unswitched, when the downlink BWP-1 is the active downlink BWP, the field of the PDCCH monitoring configuration may be 1 bit, and when the downlink BWP-2 is the active downlink BWP, the field of the PDCCH monitoring configuration may be 2 bits. In order to make the PDCCH monitoring configuration field to be common, and be capability of being applied to the cases that the downlink BWP-1 is the active downlink BWP, the downlink BWP-2 is the active downlink BWP and the active downlink BWP is switched from the downlink BWP-1 to the downlink BWP-2, the field of the PDCCH monitoring configuration may be selected as the one with the largest number of bits in the field of the PDCCH monitoring configuration, which is 2 bits. When the downlink BWP that needs to be indicated includes 2 PDCCH monitoring configurations, 2 of the 4 states indicated by the 2 bits may be as reserved states, for example, as shown in Table 3.

Table 3: mapping table of indication field values and the PDCCH monitoring configuration adopted by the UE on the new switched active downlink BWP

TABLE 3

| Indication field value | PDCCH monitoring configuration |
|---|---|
| 00 | PDCCH monitoring configuration 1 |
| 01 | PDCCH monitoring configuration 2 |
| 10 | Reserved |
| 11 | Reserved |

For the present application, when determining the PDCCH monitoring configuration on the target active downlink BWP based on the field of the PDCCH monitoring configuration on the target active downlink BWP indicated by the received physical layer signaling, following M and N are both natural numbers, and M<N, the method further includes:

1) when the maximum number N of PDCCH monitoring configurations indicated by the number of bits included in the physical layer signaling is greater than the number M of PDCCH monitoring configurations on the target active downlink BWP, the M field indicating values in the N field indicating values are used to indicate the PDCCH monitoring configuration on the target active downlink BWP, and the N−M field indication values are reserved.

Wherein, the processing manner of the above 1) is mainly for the case that the active downlink BWP is switched from the downlink BWP-1 to the downlink BWP-2, and the number of the monitoring configurations of the downlink BWP-1 configuration is smaller than the number of the monitoring configurations of the downlink BWP-2 configuration.

In a specific embodiment, the number of bits in the field of the PDCCH monitoring configuration may be determined for the PDCCH monitoring configuration of each downlink BWP. For example, the UE is configured with two downlink BWPs (e.g., the downlink BWP-1 and the downlink BWP-2). The downlink BWP-1 is configured with 2 PDCCH monitoring configurations, and the downlink BWP-2 is configured with 4 PDCCH monitoring configurations. In the case of the indication of the PDCCH monitoring configuration when the active downlink BWP is unswitched, when the downlink BWP-1 is the active downlink BWP, the field of the PDCCH monitoring configuration may be 1 bit, and when the downlink BWP-2 is the active downlink BWP, the field of the PDCCH monitoring configuration may be 2 bits. When the active downlink BWP is switched, the number of bits of the field of the PDCCH monitoring configuration is determined according to the PDCCH monitoring configuration of the downlink BWP before transforming, for example, when the active downlink BWP is switched from the downlink BWP-1 to the downlink BWP-2, the number of bits of the field of the PDCCH monitoring configuration is determined according to the PDCCH monitoring configuration 2 of the downlink BWP-1 before transforming, which is 1 bit; meanwhile, the PDCCH monitoring configuration of the switched active downlink BWP-2 of the UE is needed to be indicated, and the PDCCH monitoring configuration of the downlink BWP-2 is 4, and the 1 bit field of the PDCCH monitoring configuration may be used to indicate 2 dedicated PDCCH monitoring configurations in 4 PDCCH monitoring configurations of the downlink BWP-2, for example, 1 bit may indicate two PDCCH monitoring configurations (the first and second PDCCH monitoring configurations) in the four PDCCH monitoring configurations, and may indicate two PDCCH monitoring configurations (the first and last PDCCH monitoring configurations), as shown in Table 4.

Table 4: mapping table of indication field values and the PDCCH monitoring configuration adopted by the UE on the new switched active downlink BWP

TABLE 4

| Indication field value | PDCCH monitoring configuration |
|---|---|
| 0 | PDCCH monitoring configuration 1 |
| 1 | PDCCH monitoring configuration 4 |

2) when the maximum number P of PDCCH monitoring configurations that may be indicated by the number of bits included in the physical layer signaling is smaller than the number Q of PDCCH monitoring configurations on the target active downlink BWP, the P PDCCH monitoring configurations on the target active downlink BWPs are selected in Q Wherein, the processing manner of the above 2) is mainly for the case that the active downlink BWP is switched from the downlink BWP-2 to the downlink BWP-1, and the number of the monitoring configurations of the downlink BWP-1 configuration is smaller than the number of the monitoring configurations of the downlink BWP-2 configuration.

In a specific embodiment, when the active downlink BWP is switched from the downlink BWP-2 to the downlink BWP-1, the number of bits of the field of the PDCCH monitoring configuration is determined according to the PDCCH monitoring configuration 4 of the downlink BWP-2 before transforming, which is 2 bits; meanwhile, the PDCCH monitoring configuration of the switched active downlink BWP-1 of the UE is needed to be indicated, and the PDCCH monitoring configuration of the downlink BWP-1 is 2, and the 2 bits field of the PDCCH monitoring configuration may be used to indicate 2 PDCCH monitoring configurations in the downlink BWP-1, wherein the value of the 2 fields may be reserved, as shown in Table 3.

With this method, the UE can accurately select the appropriate PDCCH monitoring configuration used on the new switched active downlink BWP, but the method requires an additional signaling indication.

In another exemplary embodiment, the UE may infer to determine the PDCCH monitoring configuration used by the UE on the new switched active downlink BWP by receiving the common indication information or the reference signal.

Method I.3: the PDCCH monitoring configuration on the target active downlink BWP is determined according to the field of the PDCCH monitoring configuration on the indicated target active downlink BWP, if the field of the PDCCH monitoring configuration on the target active downlink BWP indicated by a physical layer signaling or common indication information or a reference signal is received; otherwise, the PDCCH monitoring configuration on the target active downlink BWP is determined according to a preset protocol or higher layer signaling configuration.

For the present application, on the new switched active downlink BWP, if the UE receives the physical layer signaling or the common indication information or the reference signal, the UE may determine the PDCCH monitoring configuration adopted on the new switched active downlink BWP by applying the method I. 2 according to the received physical layer signaling or the common indicating information or the reference signal. o On the new switched active downlink BWP, if the UE does not receive the physical layer signaling and the common indication information or the reference signal, the UE may determine the PDCCH monitoring configuration adopted on the new switched active downlink BWP by applying the method I. 1 according to the protocol preset or the high layer signaling configuration.

Manner II: the triggering manner of transforming the active downlink BWP is triggered by a timer.

In this manner, the determining the PDCCH monitoring configuration adopted on the new switched active downlink BWP in step 202 may further include one of the following methods:

Method II. 1: the PDCCH monitoring configuration on the target active downlink BWP is determined based on a protocol preset or a higher layer signaling configuration.

The UE may determine the PDCCH monitoring configuration adopted on the new switched active downlink BWP according to the protocol preset or the higher layer signaling configuration.

For example, the protocol may preset that the PDCCH monitoring configuration adopted by the UE on the new switched active downlink BWP is PDCCH monitoring configuration p, and the PDCCH monitoring configuration p may be the most power-saving, or may be suitable for transmitting the maximum amount of data. due to the transform of the active downlink BWP is not directly triggered by a signaling and the method does not require additional signaling, when transforming the active downlink BWP triggered by the timer, the method is suitable. However, this PDCCH monitoring may not be in accordance with the amount of data to be transmitted, which may not save power or transmit data in time.

Method II. 2: the PDCCH monitoring configuration on the target active downlink BWP is determined based on a field of the PDCCH monitoring configuration on the target active downlink BWP indicated by the received common indication information or the reference signal.

The UE may determine the PDCCH monitoring configuration adopted on the new switched active downlink BWP by receiving the common indication information or the reference signal.

Method II. 3: the PDCCH monitoring configuration on the target active downlink BWP is determined based on the PDCCH monitoring configuration on the current active downlink BWP and a corresponding relationship between the PDCCH monitoring configuration on the current active downlink BWP and the PDCCH monitoring configuration on the target active downlink BWP.

The UE may determine the PDCCH monitoring configuration on the new switched active downlink BWP according to the PDCCH monitoring configuration on the active downlink BWP before switched and a corresponding relationship between the PDCCH monitoring configuration on the active downlink BWP before switched and the PDCCH monitoring configuration on the new switched active downlink BWP.

The PDCCH monitoring configuration of the new switched active downlink BWP is determined according to the PDCCH monitoring configuration of the active downlink BWP before switched; although the PDCCH monitoring configuration of the active downlink BWP before switched and the PDCCH monitoring configuration of the new switched active downlink BWP are configured respectively, the PDCCH monitoring configuration of the active downlink BWP before switched and the PDCCH monitoring configuration of the new switched active downlink BWP are also possible to be different; the PDCCH monitoring configuration of the active downlink BWP before switched reflects the service amount currently required to be transmitted by the UE, it is relatively accurate that the PDCCH monitoring configuration of the new switched active downlink BWP is determined according to the PDCCH monitoring configuration of the active downlink BWP before switched. Then, if using this method, it is required to determine the corresponding relationship between the PDCCH monitoring configuration on the active downlink BWP before switched and the PDCCH monitoring configuration on the new switched active downlink BWP. For example, the UE is configured with two downlink BWPs (for example, the downlink BWP-1 and the downlink BWP-2), the downlink BWP-1 is configured with 2 PDCCH monitoring configurations, the downlink BWP-2 is configured with 4 PDCCH monitoring configurations, and the active downlink BWP of the UE is switched from the downlink BWP-1 to the downlink BWP-2, wherein the BWP-1 is the active downlink BWP before switched, and the BWP-2 is the new switched active downlink BWP. Since the PDCCH monitoring configuration on the active downlink BWP before switched is less than the PDCCH monitoring configuration on the new switched active downlink BWP, for one PDCCH monitoring configuration on the active downlink BWP before switched, it needs to be specified with one corresponding PDCCH monitoring configuration on the new switched active downlink BWP, for example, the PDCCH monitoring configuration 1 on the active downlink BWP before switched corresponds to the PDCCH monitoring configuration 1 on the new switched active downlink BWP, and the PDCCH monitoring configuration 2 on the active downlink BWP before switched corresponds to the PDCCH monitoring configuration 3 on the new switched active downlink BWP, as shown in Table 5.

Table 5: a table of corresponding relationship between the PDCCH monitoring configuration on the active downlink BWP before switched and the PDCCH monitoring configuration on the new switched active downlink BWP

TABLE 5

| PDCCH monitoring configuration on the active downlink BWP before switched | PDCCH monitoring configuration on the new switched active downlink BWP |
|---|---|
| PDCCH monitoring configuration 1 | PDCCH monitoring configuration 1 |
| PDCCH monitoring configuration 2 | PDCCH monitoring configuration 3 |

The active downlink BWP of the UE is switched from the downlink BWP-2 to the downlink BWP-1, the BWP-2 is the active downlink BWP before switched, the BWP-1 is the new switched active downlink BWP. Since the PDCCH monitoring configuration on the active downlink BWP before switched is greater than the PDCCH monitoring configuration on the new switched active downlink BWP, for one PDCCH monitoring configuration on the new switched active downlink BWP, it may be configured with two corresponding PDCCH monitoring configurations on the active downlink BWP before switched, for example, the PDCCH monitoring configurations 1 and 2 on the active downlink BWP before switched correspond to the PDCCH monitoring configuration 1 on the new switched active downlink BWP, and the PDCCH monitoring configurations 3 and 4 on the active downlink BWP before switched correspond to the PDCCH monitoring configuration 2 on the new switched active downlink BWP, as shown in Table 6.

Table 6: a table of corresponding relationship between the PDCCH monitoring configuration on the active downlink BWP before switched and the PDCCH monitoring configuration on the new switched active downlink BWP

TABLE 6

| PDCCH monitoring configuration on the active downlink BWP before switched | PDCCH monitoring configuration on the new switched active downlink BWP |
|---|---|
| PDCCH monitoring configuration 1 | PDCCH monitoring configuration 1 |
| PDCCH monitoring configuration 2 | |
| PDCCH monitoring configuration 3 | PDCCH monitoring configuration 2 |
| PDCCH monitoring configuration 4 | |

Method II. 4: If the field of the PDCCH monitoring configuration on the target active downlink BWP indicated by common indication information or a reference signal is received, the PDCCH monitoring configuration on the target active downlink BWP is determined according to the field of the PDCCH monitoring configuration on the indicated target active downlink BWP; otherwise, the PDCCH monitoring configuration on the target active downlink BWP is determined according to a protocol preset or higher layer signaling configuration, or the PDCCH monitoring configuration on the target active downlink BWP is determined according to the PDCCH monitoring configuration on the current active downlink BWP and a corresponding relationship between the PDCCH monitoring configuration on the current active downlink BWP and the PDCCH monitoring configuration on the target active downlink BWP.

For the present application, if the UE receives the common indication information or the reference signal indicating the PDCCH monitoring configuration on the target active downlink BWP, the UE may adopt the method II. 2 to determine a downlink receiving state used on the new switched active downlink BWP according to the received common indication information or reference signal.

If the UE does not receive the common indication information or the reference signal indicating the PDCCH monitoring configuration on the target active downlink BWP, the UE may adopt the method II. 1 to determine a downlink receiving state used on the new switched active downlink BWP according to the protocol preset or the high layer signaling configuration; alternatively, the UE may adopt the method II. 3, that is, the UE determines the PDCCH monitoring configuration on the new switched active downlink BWP according to the PDCCH monitoring configuration on the active downlink BWP before switched and a corresponding relationship between the PDCCH monitoring configuration on the active downlink BWP before switched and the PDCCH monitoring configuration on the new switched active downlink BWP.

In a possible implementation, the foregoing process of step S102 specifically includes the following process of step S203.

Step S203: the monitoring process on the PDCCH is performed based on the PDCCH monitoring configuration on the target active downlink BWP.

In the present application, after the current active downlink BWP is switched to the target active downlink BWP, the PDCCH monitoring configuration on the target active downlink BWP is determined and the monitoring process on the PDCCH is performed based on the PDCCH monitoring configuration on the determined target active downlink BWP, which achieves effective monitoring of the PDCCH on the switched active downlink BWP, saves power consumption of the UE, and ensures timely transmission of data.

The following describes the methods for receiving the PDCCH and the PDSCH as well as the downlink reference signal in the process of transforming the active downlink BWP, and for transmitting the PUCCH and the PUSCH as well as the uplink reference signal in the case of the unpaired spectrum, that is, the transforming processing of the active downlink BWP and the active uplink BWP paired thereof.

If the DL DCI indicating the active downlink BWP transform schedules the PDSCH of one slot, and the indication information in the DCI indicating the active downlink BWP transform indicates that the active downlink BWP is switched (that is, the active downlink BWP is switched from the BWP where the current transmission DCI is located to another downlink BWP), the UE begins to receive the PDCCH and the PDSCH as well as the downlink reference signal on the switched active downlink BWP, starting from the slot where the PDSCH scheduled by the DCI indicating the active downlink BWP transform is located; the UE does not receive the PDCCH and the PDSCH as well as the downlink reference signal, or transmit the PUCCH and the PUSCH as well as the uplink reference signal, between ending the last symbol of the PDSCH of the DCI of the active downlink BWP transform and the start of the slot where the PDSCH scheduled by the DCI indicating the active downlink BWP transform is located.

It is assumed that the UE is configured with two downlink BWPs, namely BWP-1 and BWP-2, respectively. In slot n, the UE detects a DCI indicating that the active downlink BWP transform (the DCI is transmitted by the PDCCH) on the BWP-1, which the DCI schedules the PDSCH transmitted through the BWP-2 on the slot n+L (L is a positive integer, for example, indicated by the physical layer signaling in the DCI or configured by the higher layer signaling, or preset by a protocol), then the UE begins to receive the PDSCH and PDCCH as well as the downlink reference signal on the BWP-2 form the slot n+L. The UE does not receive the PDSCH and the PDCCH as well as the downlink reference signal, or transmit the PUSCH and the PUCCH as well as the uplink reference signal, between ending the last symbol of the PDCCH of the DCI indicating the downlink activated BWP transform and the start of the slot n+L, as shown in FIG. 3. The method is applicable to the situation that the currently active downlink BWP and the target active downlink BWP are in different frequency bands. When subcarrier spatial configurations of the current active downlink BWP and the target active downlink BWP are different, the BWP transform requires a longer transform time, and during transforming, the UE cannot receive the PDSCH and the PDCCH as well as the downlink reference signal, or transmit the PUSCH and the PUCCH as well as the uplink reference signal. If the currently active downlink BWP and the target active downlink BWP are in the same frequency band, the currently activated downlink BWP and the target activated downlink BWP have the same subcarrier spatial configuration. At this time, the UE transforms from the currently active downlink BWP to the target active downlink BWP only to change the PDCCH monitoring parameters (e.g., PDCCH monitoring periodicity, candidate set of PDCCH monitoring, etc.), such BWP transform does not require a longer transform time; if the UE does not receive the PDCCH and the PDSCH as well as the downlink reference signal, or transmit the PUCCH and the PUSCH as well as the uplink reference signal, between ending the last symbol of the PDSCH of the DCI indicating the active downlink BWP transform and the start of the slot where the PDSCH scheduled by the DCI indicating the active downlink BWP transform is located, this will cause unnecessary waste of resources, and therefore, in this case, the UE may receive the PDCCH and the PDSCH as well as the downlink reference signal, and may also transmit the PUCCH and the PUSCH as well as the uplink reference signal, between ending the last symbol of the PDSCH of the DCI indicating the active downlink BWP transform and the start of the slot where the PDSCH scheduled by the DCI indicating the active downlink BWP transform is located, which saves resources in the BWP transform process. There are two specific methods to determine which of the above manners is used.

Method 1:

If parameters configured for the current active downlink BWP and the target active downlink BWP are the same (for example, the configured frequency domain resources are identical, and subcarrier spatial configurations of the current active downlink BWP and the target activated downlink BWP are identical), the UE may receive the PDCCH and the PDSCH as well as the downlink reference signal, and may also transmit the PUCCH and the PUSCH as well as the uplink reference signal, between ending the last symbol of the PDSCH of the DCI of the active downlink BWP transform and the start of the slot where the PDSCH scheduled by the DCI indicating the active downlink BWP transform is located. If parameters configured for the current active downlink BWP and the target active downlink BWP are not the same (for example, the configured frequency domain resources are not exactly the same, and subcarrier spatial configurations of the current active downlink BWP and the target activated downlink BWP are different), the UE does not receive the PDCCH and the PDSCH as well as the downlink reference signal, or transmit the PUCCH and the PUSCH as well as the uplink reference signal, between ending the last symbol of the PDSCH of the DCI of the active downlink BWP transform and the start of the slot where the PDSCH scheduled by the DCI indicating the active downlink BWP transform is located.

Method 2:

The UE receives the high layer signaling configuration and determines whether the UE may receive the PDCCH and the PDSCH as well as the downlink reference signal, and whether may transmit the PUCCH and the PUSCH as well as the uplink reference signal, in the transform process of the current downlink BWP to the target active downlink BWP (that is, between ending the last symbol of the PDSCH of the DCI of the active downlink BWP transform and the start of the slot where the PDSCH scheduled by the DCI indicating the active downlink BWP transform is located). For example, the UE is configured with 3 downlink BWPs, namely BWP-1, BWP-2, and BWP-3, and when the high layer signaling configures the UE to transform from BWP-1 to BWP-2, or the UE to transform from BWP-2 to BWP-1, the UE may receive the PDSCH and the PDCCH as well as the downlink reference signal, and may also transmit the PUCCH and the PUSCH as well as the uplink reference signal; when the high layer signaling configures the UE to transform from the BWP-1 to the BWP-3, or the UE to transform from BWP-3 to BWP-1, the UE does not receive the PDSCH and the PDCCH as well as the downlink reference signal, or transmit the PUCCH and the PUSCH as well as the uplink reference signal; the high layer signaling configures the UE to transform from the BWP-2 to the BWP-3, or the UE to transform from the BWP-3 to the BWP-2, the UE does not receive the PDSCH and the PDCCH as well as the downlink reference signal, or transmit the PUCCH and the PUSCH as well as the uplink reference signal.

Based on the foregoing PDCCH monitoring method provided by the present application, the present application further provides a PDCCH monitoring apparatus. As shown in FIG. 4, the PDCCH monitoring apparatus 30 includes a determining unit 31 and a monitoring unit 32.

The determining unit 31 is configured to determine PDCCH monitoring configuration on the target active downlink BWP after a current active downlink bandwidth part (BWP) is switched to a target active downlink BWP;

The monitoring unit 32 is configured to perform a monitoring process on the PDCCH based on the PDCCH monitoring configuration on the target active downlink BWP.

In a possible implementation, the determined unit 31 is configured to determine, according to a triggering manner of a transform process on the active downlink BWP, the PDCCH monitoring configuration on the target active downlink BWP; or to determine the PDCCH monitoring configuration on the target active downlink BWP based on the PDCCH monitoring configuration on the current active downlink BWP.

In a possible implementation, when the triggering manner is a triggering manner that DCI indication for scheduling PDSCH triggers the transform process on the active downlink BWP, the determined unit 31 is specifically configured to determine the PDCCH monitoring configuration on the target active downlink BWP based on a protocol preset or a high layer signaling configuration; or specifically configured to determine the PDCCH monitoring configuration on the target active downlink BWP based on a field of the PDCCH monitoring configuration on the target active downlink BWP indicated by a received physical layer signaling or common indication information or reference signal; or specifically configured to determine the PDCCH monitoring configuration on the target active downlink BWP according to the field of the PDCCH monitoring configuration on the indicated target active downlink BWP, if the field of the PDCCH monitoring configuration on the target active downlink BWP indicated by a physical layer signaling or common indication information or a reference signal is received; otherwise, to determine the PDCCH monitoring configuration on the target active downlink BWP according to the protocol preset or the higher layer signaling configuration.

In a possible implementation, the determined unit 31 is further for, when the maximum number N of PDCCH monitoring configurations indicated by the number of bits included in the physical layer signaling is greater than the number M of PDCCH monitoring configurations on the target active downlink BWP, the M field indicating values in the N field indicating values being used to indicate the PDCCH monitoring configuration on the target active downlink BWP, the N−M field indication values being reserved, and the M<N; further for, when the maximum number P of PDCCH monitoring configurations indicated by the number of bits included in the physical layer signaling is smaller than the number Q of PDCCH monitoring configurations on the target active downlink BWP, selecting P PDCCH monitoring configurations on the target active downlink BWP in Q.

In a possible implementation, when the triggering manner is a triggering manner that triggers the transform process on the active downlink BWP based on a timer, the determined unit 31 is specifically configured to determine the PDCCH monitoring configuration on the target active downlink BWP based on a protocol preset or a high layer signaling configuration; or specifically configured to determine the PDCCH monitoring configuration on the target active downlink BWP based on a field of the PDCCH monitoring configuration on the target active downlink BWP indicated by received common indication information or reference signal; or specifically configured to determine the PDCCH monitoring configuration on the target active downlink BWP based on the PDCCH monitoring configuration on the current active downlink BWP and a corresponding relationship between the PDCCH monitoring configuration on the current active downlink BWP and the PDCCH monitoring configuration on the target active downlink BWP; or specifically configured to determine the PDCCH monitoring configuration on the target active downlink BWP according to the field of the PDCCH monitoring configuration on the indicated target active downlink BWP, if the field of the PDCCH monitoring configuration on the target active downlink BWP indicated by common indication information or a reference signal is received; otherwise, to determine the PDCCH monitoring configuration on the target active downlink BWP according to a protocol preset or a higher layer signaling configuration, or determining the PDCCH monitoring configuration on the target active downlink BWP according to the PDCCH monitoring configuration on the current active downlink BWP and a corresponding relationship between the PDCCH monitoring configuration on the current active downlink BWP and the PDCCH monitoring configuration on the target active downlink BWP.

In a possible implementation, the PDCCH monitoring configuration includes at least one of the followings:
- a periodicity of PDCCH monitoring;
- the number of PDCCH monitoring times;
- an aggregation level (AL) of a control channel unit (CCE) of PDCCH monitoring.

In the present application, after the current active downlink BWP is switched to the target active downlink BWP, the PDCCH monitoring configuration on the target active downlink BWP is determined and the monitoring process on the PDCCH is performed based on the determined PDCCH monitoring configuration on the target active downlink BWP, which achieves effective monitoring of the PDCCH on the switched active downlink BWP, saves power consumption of the UE, and ensures timely transmission of data.

Based on the foregoing PDCCH monitoring method provided by the present application, the present application further provides an electronic device, for example, the electronic device 1300 shown in FIG. 5, including a processor 1301 and a memory 1303. Wherein, the processor 1301 is connected to the memory 1303, for example, through a bus 1302. Optionally, the electronic device 1300 may also include a transceiver 1304. It should be noted that, in actual applications, the number of the transceivers 1304 is not limited to one, and the structure of the electronic device 1300 does not constitute a limitation on the embodiments of the present application.

Wherein, the processor 1301 is used in the embodiments of the present application to implement the functions of the determining unit 31 and the monitoring unit 32 shown in FIG. 4. The transceiver 1304 includes a receiver and a transmitter.

The processor 1301 may be a CPU, a general-purpose processor, a DSP, an ASIC, and an FPGA or other programmable logic devices, transistor logic devices, hardware components, or any combination thereof. It is possible to implement or carry out the various illustrative logical blocks, modules and circuits described in connection with the present application. The processor 1301 may also be a combination of computing functions, such as one or more microprocessor combinations, a combination of a DSP and a microprocessor, and the like.

The bus 1302 may include a path for communicating information between the above components. The bus 1302 may be a PCI bus or an EISA bus. The bus 1302 may be classified into an address bus, a data bus, a control bus, and the like. For convenience of representation, only one thick line in FIG. 5 is used to represent the bus, but it does not mean that there is only one bus or one type of bus.

The memory 1303 may be a ROM or other type of static storage device that may store static information and instructions, RAM or other types of Dynamic storage device that may store information and instruction, may also be EEPROM, CD-ROM or other optical disc storage, optical disc storage (including compression optical discs, laser discs, optical discs, digital versatile discs, Blu-ray discs, etc.), magnetic disk storage medium or other magnetic storage devices, or any other medium that may be used to carry or store desired program codes in form of instruction or data structure and may be accessed by the computer, which is not limited to these.

The memory 1303 is used to store application program codes for executing the solution of the present application, and is controlled by the processor 1301 for execution. The processor 1301 is configured to execute the application program codes stored in the memory 1303 to implement the actions of the PDCCH monitoring apparatus provided by the embodiment as shown in FIG. 4.

In the present application, after the current active downlink BWP is switched to the target active downlink BWP, the PDCCH monitoring configuration on the target active downlink BWP is determined and the monitoring process on the PDCCH is performed based on the determined PDCCH monitoring configuration on the target active downlink BWP, which achieves effective monitoring of the PDCCH on the switched active downlink BWP, saves power consumption of the UE, and ensures timely transmission of data.

Based on the PDCCH monitoring method provided by the present application, the present application further provides a computer readable storage medium configured to store a computer program, when executed by a processor, implements steps of the foregoing PDCCH monitoring methods.

In the present application, after the current active downlink BWP is switched to the target active downlink BWP, the PDCCH monitoring configuration on the target active downlink BWP is determined and the monitoring process on the PDCCH is performed based on the determined PDCCH monitoring configuration on the target active downlink BWP, which achieves effective monitoring of the PDCCH on the switched active downlink BWP, saves power consumption of the UE, and ensures timely transmission of data.

Those skilled in the art will appreciate that the present application includes devices related to performing one or more of the operations described herein. These devices may be specially designed and manufactured for required purposes, or may also include known devices in a general-purpose computer. These devices have computer programs stored therein that are selectively activated or reconfigured. Such computer programs may be stored in a device (e.g., a computer) readable medium or in any type of medium suitable for storing electronic instructions and respectively coupled to a bus, including but not limited to, any types of disks (including floppy disks, optical disks. CD-ROMs, and magnetic-optical disks), read-only memory (ROM), random access memory (RAM), erasable programmable ROM (EPROM), electrically erasable programmable ROM (EEPROM), flash memory, magnetic or optical cards. That is, the readable medium includes any medium that is stored or transmitted by a device (e.g., a computer) in a readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present application may be alternated, changed, combined or deleted. Further, other steps, measures and solutions in the operations, methods and flows already discussed in the present application may also be alternated, changed, rearranged, decomposed, combined or deleted. Further, the steps, measures and solutions of the prior art in the operations, methods and operations disclosed in the present application may also be alternated, changed, rearranged, decomposed, combined or deleted.

The foregoing are preferable examples of the application. Ordinary technical personnel in the field may make some improvements and modifications without departing from principles of the application, and these improvements and modifications also belong to the protection scope of the present application.

The invention claimed is:

1. A physical downlink control channel (PDCCH) monitoring method by a user equipment (UE), the PDCCH monitoring method comprising:
receiving higher layer signaling including PDCCH monitoring configuration information for a target active downlink bandwidth part (BWP) on a current active downlink BWP, wherein the PDCCH monitoring configuration information indicates a relationship between a PDCCH monitoring configuration for the current active downlink BWP and a PDCCH monitoring configuration for the target active downlink BWP;
determining the PDCCH monitoring configuration for the target active downlink BWP, based on the relationship, after the current active downlink BWP is switched to the target active downlink BWP; and
performing a monitoring process on a PDCCH based on the PDCCH monitoring configuration for the target active downlink BWP,
wherein the PDCCH monitoring configuration for the target active downlink BWP comprises at least one of:
a periodicity of PDCCH monitoring;
a number of times to perform the PDCCH monitoring; or
an aggregation level (AL) of a control channel element (CCE) of the PDCCH monitoring.

2. The PDCCH monitoring method according to claim 1, wherein determining the PDCCH monitoring configuration for the target active downlink BWP comprise one of:
determining the PDCCH monitoring configuration on the target active downlink BWP based on a manner in which switching of the current active downlink BWP to the target active downlink BWP is triggered; or
determining the PDCCH monitoring configuration on the target active downlink BWP based on the PDCCH monitoring configuration for the current active downlink BWP.

3. The PDCCH monitoring method according to claim 2, wherein when a downlink control information (DCI) indication for scheduling a physical downlink shared channel (PDSCH) is used for triggering the switching of the current active downlink BWP to the target active downlink BWP, determining the PDCCH monitoring configuration for the target active downlink BWP comprises determining the PDCCH monitoring configuration for the target active downlink BWP, based on a protocol preset or a higher layer signaling configuration.

4. The PDCCH monitoring method according to claim 2, wherein when a downlink control information (DCI) indication for scheduling a physical downlink shared channel (PDSCH) is used for triggering the switching of the current active downlink BWP to the target active downlink BWP, determining the PDCCH monitoring configuration for the target active downlink BWP comprises determining the PDCCH monitoring configuration for the target active downlink BWP, based on a field of the PDCCH monitoring configuration for the target active downlink BWP indicated by physical layer signaling, common indication information, or a reference signal.

5. The PDCCH monitoring method according to claim 4, wherein, when determining the PDCCH monitoring configuration for the target active downlink BWP based on the field of the PDCCH monitoring configuration on the target active downlink BWP indicated by the physical layer signaling:
when a maximum number N of PDCCH monitoring configurations indicated by a number of bits included in the physical layer signaling is greater than a number M of PDCCH monitoring configurations on the target active downlink BWP, M fields indicates values in N fields indicating values being used to indicate the PDCCH monitoring configuration for the target active downlink BWP, N-M field indication values are reserved, and M<N; and
when a maximum number P of PDCCH monitoring configurations indicated by the number of bits included in the physical layer signaling is smaller than a number Q of PDCCH monitoring configurations for the target active downlink BWP, the method further comprises selecting P PDCCH monitoring configurations in Q PDCCH monitoring configurations for the target active downlink BWP.

6. The PDCCH monitoring method according to claim 2, wherein when a downlink control information (DCI) indication for scheduling a physical downlink shared channel (PDSCH) is used for triggering the switching of the current active downlink BWP to the target active downlink BWP, determining the PDCCH monitoring configuration for the target active downlink BWP comprises determining the PDCCH monitoring configuration for the target active downlink BWP according to the field of the PDCCH monitoring configuration for the indicated target active downlink BWP, if the field of the PDCCH monitoring configuration for the target active downlink BWP is indicated by physical layer signaling, common indication information, or a reference signal; and otherwise, determining the PDCCH monitoring configuration for the target active downlink BWP according to a preset protocol or a higher layer signaling configuration.

7. The PDCCH monitoring method according to claim 2, wherein, when a timer is used for triggering the switching of the current active downlink BWP to the target active downlink BWP, determining the PDCCH monitoring configuration for the target active downlink BWP comprises at least one of:
determining the PDCCH monitoring configuration for the target active downlink BWP based on a protocol preset or a higher layer signaling configuration;
determining the PDCCH monitoring configuration for the target active downlink BWP based on a field of the PDCCH monitoring configuration for the target active downlink BWP indicated by received common indication information or a reference signal;
determining the PDCCH monitoring configuration for the target active downlink BWP based on the PDCCH monitoring configuration for the current active downlink BWP and the relationship between the PDCCH monitoring configuration for the current active downlink BWP and the PDCCH monitoring configuration for the target active downlink BWP; and
determining the PDCCH monitoring configuration for the target active downlink BWP according to the field of the PDCCH monitoring configuration for the indicated target active downlink BWP, if the field of the PDCCH monitoring configuration on the target active downlink BWP is indicated by common indication information or a reference signal;
otherwise, determining the PDCCH monitoring configuration for the target active downlink BWP according to the protocol preset or the higher layer signaling configuration, or determining the PDCCH monitoring configuration for the target active downlink BWP according to the PDCCH monitoring configuration on the current active downlink BWP and the relationship between the PDCCH monitoring configuration on the current active downlink BWP and the PDCCH monitoring configuration on the target active downlink BWP.

8. An electronic device, comprising:
a processor; and
a memory and bus connected to the processor,
wherein, the processor and the memory complete communication with each other through the bus, and the processor is configured to invoke a program instruction in the memory to:
receive higher layer signaling including physical downlink control channel (PDCCH) monitoring configuration information for a target active downlink bandwidth part (BWP) on a current active downlink BWP, wherein the PDCCH monitoring configuration information indicates a relationship between a PDCCH monitoring configuration for the current active downlink BWP and a PDCCH monitoring configuration for the target active downlink BWP;
determine the PDCCH monitoring configuration for the target active downlink BWP, based on the relationship, after the current active downlink BWP is switched to the target active downlink BWP; and
perform a monitoring process on a PDCCH based on the PDCCH monitoring configuration for the target active downlink BWP,
wherein the PDCCH monitoring configuration for the target active downlink BWP comprises at least one of:
a periodicity of PDCCH monitoring;
a number of time to perform the PDCCH monitoring; or
an aggregation level (AL) of a control channel element (CCE) of the PDCCH monitoring.

9. The electronic device according to claim 8, wherein the processor is further configured to invoke a program instruction in the memory to:
determine the PDCCH monitoring configuration for the target active downlink BWP based on a manner in which switching of the current active downlink BWP to the target active downlink BWP is triggered; and
determine the PDCCH monitoring configuration for the target active downlink BWP based on the PDCCH monitoring configuration for the current active downlink BWP.

10. The electronic device according to claim 9, wherein when a downlink control information (DCI) indication for scheduling a physical downlink shared channel (PDSCH) is used for triggering the switching of the current active downlink BWP to the target active downlink BWP, the processor is further configured to invoke a program instruction in the memory to:
determine the PDCCH monitoring configuration for the target active downlink BWP based on a protocol preset or a higher layer signaling configuration.

11. The electronic device according to claim 9, wherein when a downlink control information (DCI) indication for scheduling a physical downlink shared channel (PDSCH) is used for triggering the switching of the current active downlink BWP to the target active downlink BWP, the processor is further configured to invoke a program instruction in the memory to:
determine the PDCCH monitoring configuration for the target active downlink BWP based on a field of the PDCCH monitoring configuration for the target active downlink BWP indicated by physical layer signaling, common indication information, or a reference signal.

12. The electronic device according to claim 11, wherein, when determining the PDCCH monitoring configuration for the target active downlink BWP based on the field of the PDCCH monitoring configuration for the target active downlink BWP indicated by the received physical layer signaling:
when a maximum number N of PDCCH monitoring configurations indicated by a number of bits included in the physical layer signaling is greater than a number M of PDCCH monitoring configurations for the target active downlink BWP, M fields indicating values in N fields indicating values are used to indicate the PDCCH monitoring configuration for the target active downlink BWP, N-M field indication values are reserved, and M<N; and
when a maximum number P of PDCCH monitoring configurations indicated by the number of bits included in the physical layer signaling is smaller than a number Q of PDCCH monitoring configurations for the target active downlink BWP, the processor is configured to select P PDCCH monitoring configurations in Q PDCCH monitoring configurations for the target active downlink BWP.

13. The electronic device according to claim 9, wherein when a downlink control information (DCI) indication for scheduling a physical downlink shared channel (PDSCH) is used for triggering the switching of the current active downlink BWP to the target active downlink BWP, the processor is further configured to invoke a program instruction in the memory to:
determine the PDCCH monitoring configuration for the target active downlink BWP according to the field of the PDCCH monitoring configuration for the indicated target active downlink BWP, if the field of the PDCCH monitoring configuration for the target active downlink BWP indicated by physical layer signaling, common indication information, or a reference signal;
otherwise, determine the PDCCH monitoring configuration for the target active downlink BWP according to a preset protocol or a higher layer signaling configuration.

14. The electronic device according to claim 9, wherein, when a timer is used for triggering the switching of the current active downlink BWP to the target active downlink BWP, the processor is configured to perform at least one of:
determining the PDCCH monitoring configuration for the target active downlink BWP based on a protocol preset or a higher layer signaling configuration;
determining the PDCCH monitoring configuration for the target active downlink BWP based on a field of the PDCCH monitoring configuration for the target active downlink BWP indicated by received common indication information or a reference signal;
determining the PDCCH monitoring configuration for the target active downlink BWP based on the PDCCH monitoring configuration for the current active downlink BWP and the relationship between the PDCCH monitoring configuration for the current active downlink BWP and the PDCCH monitoring configuration for the target active downlink BWP; and determining the PDCCH monitoring configuration for the target active downlink BWP according to the field of the PDCCH monitoring configuration for the indicated target active downlink BWP, if the field of the PDCCH monitoring configuration for the target active downlink BWP is indicated by common indication information or a reference signal;

otherwise, determining the PDCCH monitoring configuration for the target active downlink BWP according to the protocol preset or the higher layer signaling configuration, or determining the PDCCH monitoring configuration for the target active downlink BWP according to the PDCCH monitoring configuration for the current active downlink BWP and the relationship between the PDCCH monitoring configuration for the current active downlink BWP and the PDCCH monitoring configuration for the target active downlink BWP.

15. A physical downlink control channel (PDCCH) monitoring method by a user equipment (UE), the PDCCH monitoring method comprising:

receiving radio resource control (RRC) signaling including first information for searching PDCCH candidates and second information on a maximum number of PDCCH monitorings, wherein the first information includes a periodicity of PDCCH monitoring, and an aggregation level (AL) of a control channel element (CCE) of the PDCCH monitoring;

receiving downlink control information (DCI) including information associated with the PDCCH monitoring, wherein a field of the PDCCH monitoring is 1 bit or 2 bits; and monitoring a PDCCH on a new active downlink (DL) bandwidth part (BWP) in case that the UE changes to the new active DL BWP according to a timer.

* * * * *